Oct. 9, 1945.   G. W. PANCOE ET AL   2,386,710
STRUCTURAL UNIT AND ASSEMBLY
Filed Aug. 17, 1944   3 Sheets-Sheet 2

INVENTOR
George W. Pancoe
Albert G. Dean
BY John P. Tarbox
ATTORNEY

Oct. 9, 1945.   G. W. PANCOE ET AL   2,386,710
STRUCTURAL UNIT AND ASSEMBLY
Filed Aug. 17, 1944   3 Sheets-Sheet 3
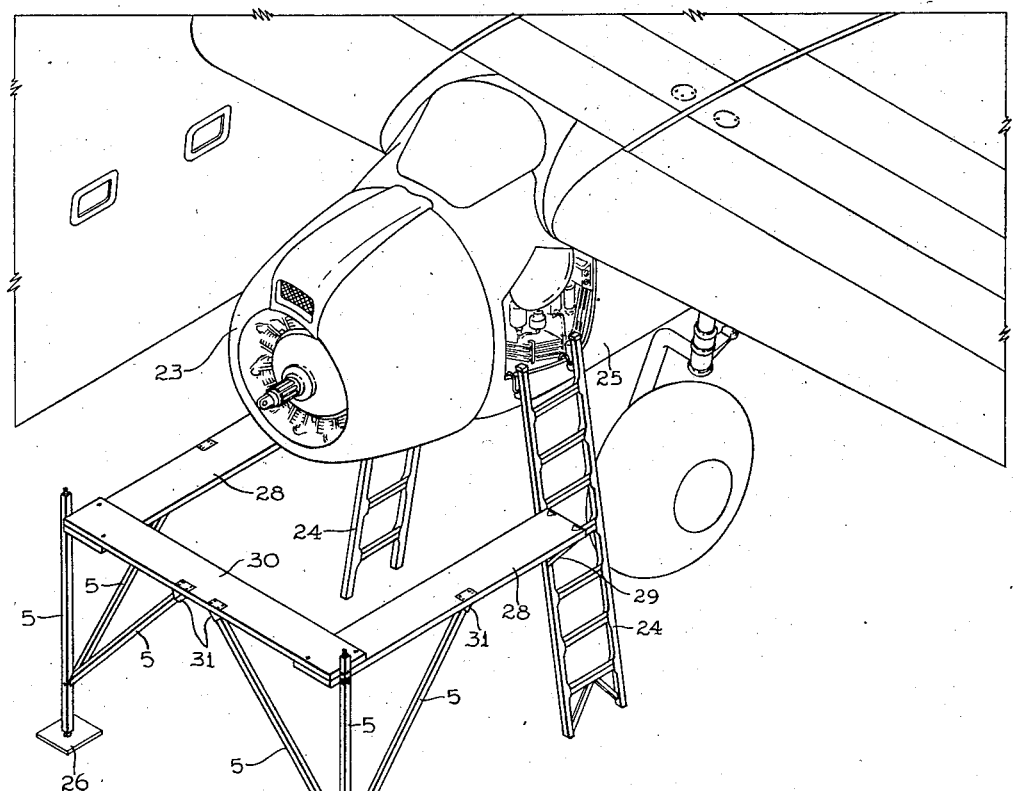
FIG. 9
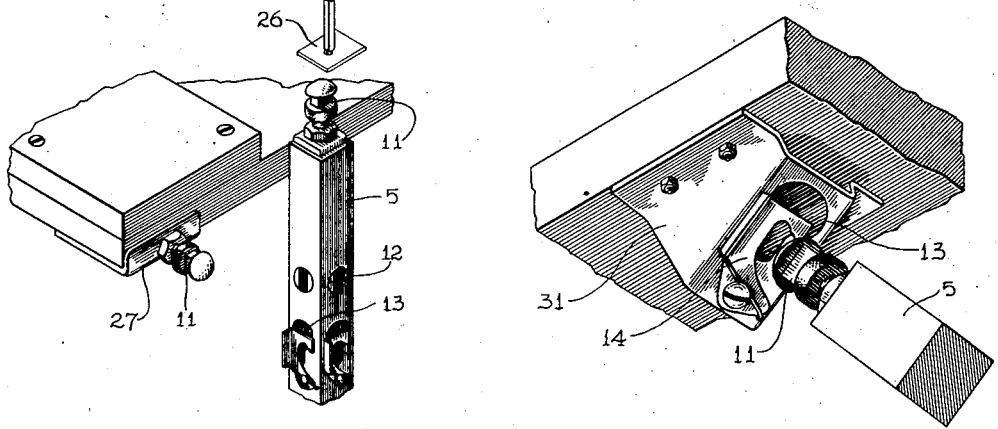
FIG. 10
FIG. 11
INVENTOR
George W. Pancoe
Albert G. Dean
BY John P. Tarbox
ATTORNEY Patented Oct. 9, 1945

2,386,710

UNITED STATES PATENT OFFICE 2,386,710

STRUCTURAL UNIT AND ASSEMBLY

George W. Pancoe, Philadelphia, and Albert G. Dean, Narberth, Pa., assignors to Edward G. Budd Manufacturing Company, Philadelphia, Pa., a corporation of Pennsylvania Application August 17, 1944, Serial No. 549,924

5 Claims. (Cl. 189—34)

This invention relates to a structural unit and to an assembly formed therewith and has for an object the provision of improvements in this art.

According to this invention there is provided a stanchion or post having improved fittings whereby it is adapted to cooperate readily with similar posts and with other parts and fittings to build up composite structures of various kinds such as partitions, scaffolds, frames and the like. The unit and the structures in which it is used are very light and are well suited for use in transport vehicles such as ships, cars, trucks, aircraft, and the like.

The objects and advantages of the invention will be apparent from the following description of an exemplary embodiment thereof, reference being made to the accompanying drawings, wherein:

Figure 9 is a perspective view of an engine scaffold formed partly with elements embodying the present invention;

Figure 10 is a perspective view of a detail from Figure 9 during assembly; and

Figure 11 is a perspective view of another detail during assembly.

Figure 1:
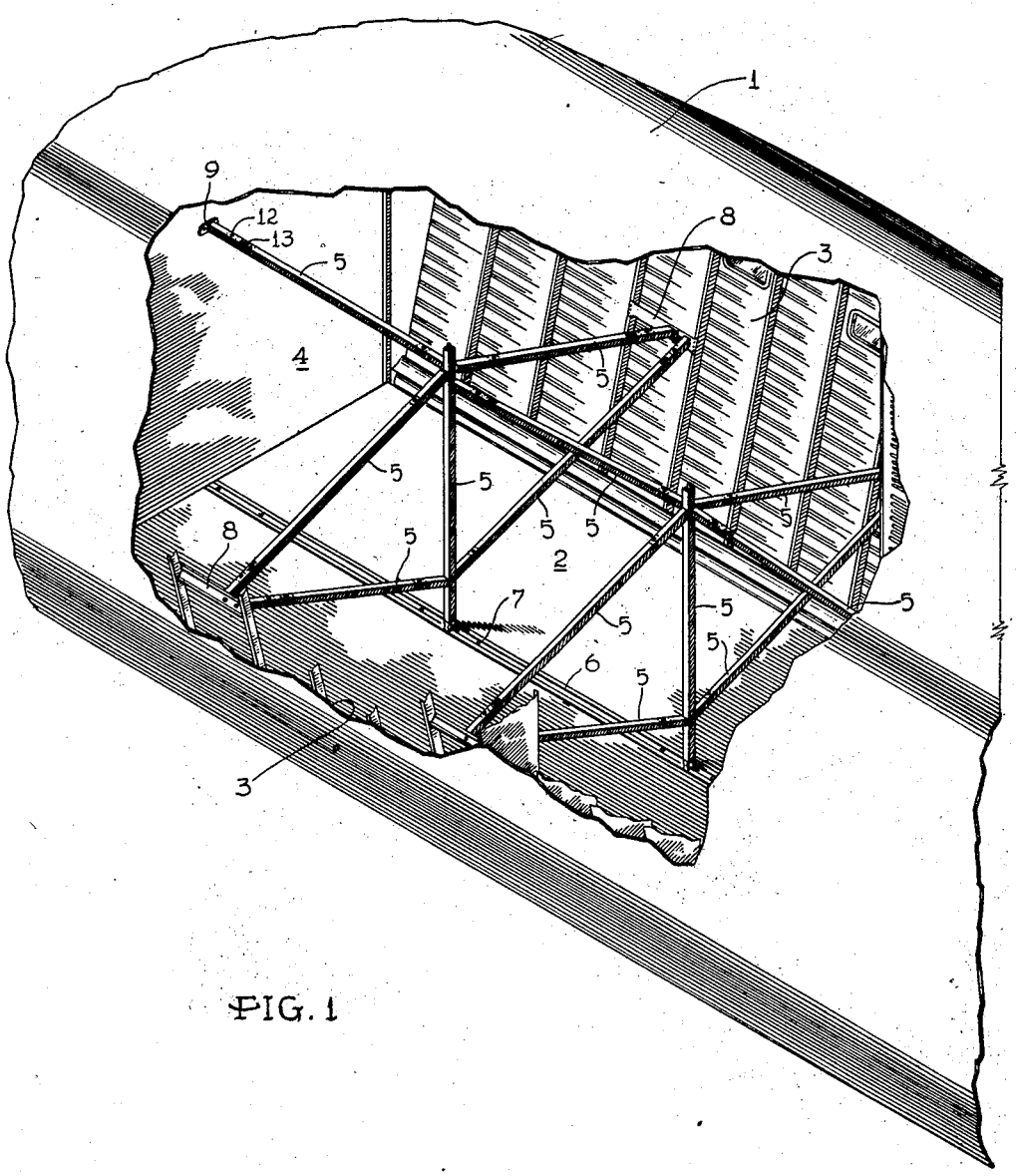
Figure 1 is a perspective view of the interior of the cargo compartment of an airplane showing partitions formed by stanchions or posts made according to the present invention.

Referring to the drawings, an airplane cargo body 1 includes a floor 2, side walls 3, and a partition or bulkhead 4.

A plurality of stanchions or posts 5 are connected with each other and with anchorages on the body to provide cargo holding compartments. The floor is shown to be provided with one or more rails 6 in which sockets 7 are provided at intervals. The rail illustrated is at the center but rails may be located at the sides or at both center and sides. The post-formed partitions shown extend entirely across the cargo space but it may be desirable to form partitions on one or both sides with a passageway along the compartment.

At any desired locations the side walls may be provided with socket supports 8 and the bulkhead with a socket support 9.

The post 5 is tubular, preferably rectangular in cross section, has plugs 10 and 11 on the ends and sockets 12 and 13 on the sides. The plugs 10 are of the turning type and are adapted to engage in the rectangular sockets 12; the plugs 11 are of the sliding type and are adapted to engage in the keyhole bayonet type sockets 13. Spring operated latches 14 are associated with the bayonet type sockets 13 to hold the plugs therein.

Figure 2:
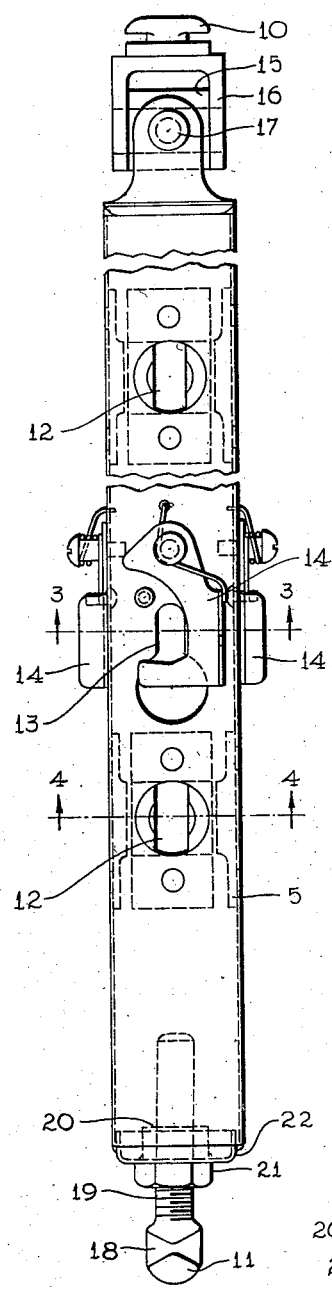
Figure 2 is a side elevation of a stanchion alone.
Figure 3:
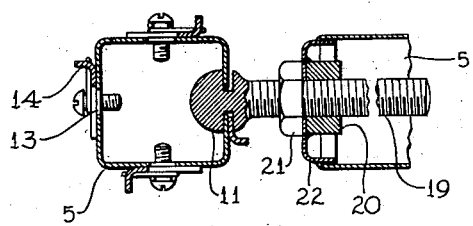
Figure 3 is a transverse section taken on the line 3—3 of Figure 2 but with the end of another stanchion connected thereto.
Figure 4:
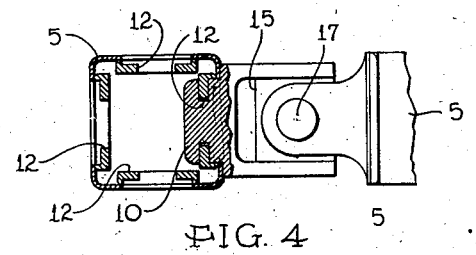
Figure 4 is a transverse section taken on the line 4—4 of Figure 2 but with the other end of another stanchion connected thereto.
Figure 7:
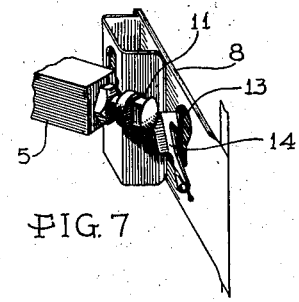
Figure 7 is a perspective view similar to Figure 6 but showing a connection being made to a fixed anchorage.
Figure 5:
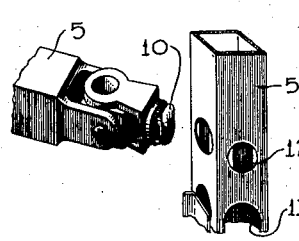
Figure 5 is a side perspective view of the parts shown in Figure 4 during a stage of assembly.
Figure 6:
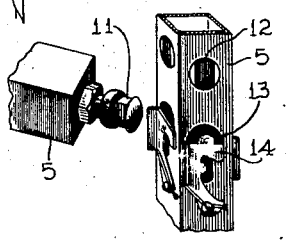
Figure 6 is a side perspective view of the parts shown in Figure 3 during a stage of assembly and with a slightly modified form of post end.
Figure 8:
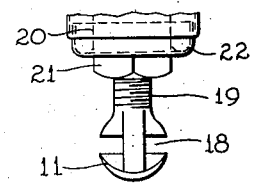
Figure 8 is a side elevation of the lower end of the post shown in Figure 2.

In certain locations it is desirable to secure the posts in angular positions, and for taking care of this condition the plugs are suitably constructed. Preferably, the plug 10 at one end is universally mounted, as by a block 15 and pins 16 and 17 disposed at ninety degrees relative to each other. The plug 11 at the other end is provided with oppositely disposed slots 18 on the sides of the head, the slots being over-width either throughout their length, as shown in Figures 6, 7, 10 and 11, or of increasing width from the center as shown in Figures 2, 3 and 8, to permit angular dispositions of the post relative to the face of the slot. The first form permits some end play when the post is disposed normal to the face of the slot; but the second form substantially prevents end play in all positions of the post.

The effective length of the post is made adjustable in any suitable manner, as by providing the plug 11 with a screw threaded shank 19 of desired length which is threaded into a fixed nut 20 secured in the end of the post, a locknut 21 being employed to hold the shank in various adjusted positions. The entire assembly is mounted on a cap 22 which may be secured to the end of the post, as by welding or other convenient means.

The sockets may be arranged in any number and disposition on the posts. One arrangement which has been found convenient and suitable for present purposes, is to provide four sockets of like kind in a ring around the post, one in each of the rectangular sides, to provide a group of rectangular sockets 12 near each end, and to provide a group of keyhole or bayonet sockets 13 near one end. One group of rectangular sockets may be nearer the end than the other.

Figure 1 shows the arrangement of the posts in the cargo compartment. Here the vertical posts have their turn plugs 10 inserted in rectangular sockets 7 (the same as 12) in the floor rail 6 and turned ninety degrees. Inclined posts have their turn plugs 10 inserted in rectangular sockets 12 near the bottom and top of the vertical posts and are turned ninety degrees, then have their slide plugs 11 inserted in keyhole sockets 13 in supports 8 of the airplane side walls and retained by latches 14. A top horizontal post has its turn plug inserted in a rectangular socket of the vertical post which is adjacent the bulkhead 4, is turned ninety degrees and has its slide plug engaged in a keyhole slot 9 (the same as 13) on the bulkhead. Between vertical posts other horizontal posts have their turn plugs inserted in the rectangular sockets of one vertical post and are turned and have their slide plugs secured in keyhole sockets of adjacent vertical posts.

If the posts are not of correct length adjustment is made by the threaded shanks 19. If the plug slots do not fall in the right direction this also may be corrected by turning the shanks the required amount and locking them in position.

By reason of the fact that the vertical posts have been turned in their floor sockets and have other posts anchored to their sides, there is no danger of their turning to the release position. The floor sockets are closely and completely covered by parts of the plugs, thus keeping dirt out of those sockets in which posts are disposed. Other sockets in the floor may be closed by blank plugs, if desired.

Similarly, when the other posts have had their turn plugs inserted and turned in rectangular sockets and have their slide plugs inserted and latched in the keyhole sockets there is no danger of their turning.

It would, of course, be possible to use all plugs and mating sockets of either kind to the exclusion of the other kind but there are apparent advantages in using a combination of the two types of plugs and sockets. In particular, the turning and securing of posts provides a very dependable construction; moreover the latches are kept away from locations where they are most likely to be injured.

In Figures 9-11 a scaffold is built for working upon an engine 23. Here a ladder 24 is hooked in the opening of the cowl 25 on each side of the engine. The turn plugs of corner posts 5 are inserted and turned in rectangular sockets of base plates 26; and slide plugs 11, which are provided on metal corner plates 27, are inserted and latched in keyhole slots of the posts. The plates 27 are secured to boards 28 whose other ends are secured to brackets 29 attached to the ladders. An end board 30 is secured to the side boards 28 as by bolts or screws. Bracing posts 5 have their universal turn plugs connected with rectangular sockets near the bottoms of the corner posts and have their slide plugs inserted and latched in keyhole sockets carried by angle plates 31 secured beneath the boards.

Such a scaffold is very quickly erected and removed and is very strong and sturdy in use. By placing the plugs on the ends of the posts and the sockets on the sides, the sides are left free of obstructions and thus stack easily and do not catch passing objects.

It will be understood that many other forms and structures are possible within the limits of the invention as defined in the following claims.

What is claimed is:

1. A structural post unit comprising a post having a plug universally connected to one end, and a second plug connected for longitudinal adjustment to the other end, and mating sockets on the side of the post, whereby the ends of one post can be interfitted with the sides of like posts and vice versa.

2. A structural post unit comprising a post, a turn-type plug connected by a universal to one end of the post, a slide-type plug connected to the other end of the post and having side grooves providing angular movement in a socket, a rectangular socket in the side of the post adapted to mate with a turning plug of the first type and a keyhole and latch socket on the side of the post adapted to mate with plugs of the second type.

3. A structural unit comprising a rectangular tubular post having an universally mounted turn-type plug mounted on one end, a longitudinally adjustable angularly variable plug of the slide-type mounted on the other end, an annular group of elongated sockets provided on the sides of the post near each end and adapted to engage plugs of the first type by an entering and turning movement, and an annular group of keyhole type sockets provided on the sides of the post near one end and adapted to engage plugs of the second type by an entering and sidewise sliding movement.

4. A structural post unit comprising a post having interfitting elements of two types on its respective ends and mating interfitting elements of two types on the sides, the element on one end being of the turn-locking type and the element on the other end being of the slide-locking type, one type of the side elements on the post comprising a rectangular socket adapted to mate with the turn-locking element on one end of another post and the other type of side element on the post comprising a keyhole shaped opening and a latch therefor adapted to mate with a slide-locking element on the other end of another post, whereby the ends of one post can be interfitted with the side of another post and vice versa.

5. A structural post unit comprising a post having interfitting elements of two types on its respective ends and mating interfitting elements of two types on the sides, the element on one end being of the turn-locking type and the element on the other end being of the slide-locking type, the end elements both being projecting plugs and the side elements all being sockets, at least one set of interfitting elements providing a swinging movement of the post after its end is connected, one type of the side elements on the post comprising a rectangular socket adapted to mate with the turn-locking element on one end of another post and the other type of side element on the post comprising a keyhole shaped opening and a latch therefor adapted to mate with a slide-locking element on the other end of another post.

GEORGE W. PANCOE.
ALBERT G. DEAN.